US012086534B2

(12) United States Patent
Zhou et al.

(10) Patent No.: US 12,086,534 B2
(45) Date of Patent: Sep. 10, 2024

(54) MULTI-COMPONENT ABSTRACT ASSOCIATION AND FUSION METHOD AND APPARATUS IN PAGE DESIGN (71) Applicant: ZHEJIANG LAB, Zhejiang (CN)

(72) Inventors: Tianshu Zhou, Hangzhou (CN); Xin Gao, Hangzhou (CN); Jingsong Li, Hangzhou (CN); Yu Tian, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/360,794

(22) Filed: Jul. 27, 2023

(65) Prior Publication Data
US 2024/0061993 A1 Feb. 22, 2024

(30) Foreign Application Priority Data

Aug. 16, 2022 (CN) .......................... 202210980794.7

(51) Int. Cl.
G06F 40/14 (2020.01)
G10L 15/22 (2006.01)

(52) U.S. Cl.
CPC .............. G06F 40/14 (2020.01); G10L 15/22 (2013.01); G10L 2015/223 (2013.01)

(58) Field of Classification Search
CPC .... G06F 40/14; G10L 15/22; G10L 2015/223
USPC ........................................................ 715/234
See application file for complete search history.

(56) References Cited

U.S. PATENT DOCUMENTS 9,594,737 B2 * 3/2017 Wolfram ................. G06F 16/90
2007/0186156 A1 * 8/2007 Bagare ...................... G06F 8/30
715/234
2008/0243935 A1 10/2008 Castro et al.
(Continued)

FOREIGN PATENT DOCUMENTS

| CN | 107291736 A | 10/2017 |
| CN | 107908399 A | 4/2018 |
| CN | 114327564 A | 4/2022 |

OTHER PUBLICATIONS

Notice Of Allowance(CN202210980794.7); Date of Mailing: Oct. 9, 2022.
A-new-mode-of-WebGIS-development-based-on-Ajax.

Primary Examiner — Kieu D Vu
Assistant Examiner — Nicholas Hasty
(74) Attorney, Agent, or Firm — W&G Law Group (57) ABSTRACT The present disclosure discloses a multi-component abstract association and fusion method and apparatus in page design. The method includes the following steps: step S1: a construction demand is acquired, and the construction demand is analyzed through a speech recognition method to obtain a natural language text; step S2: an abstract model is constructed by predefining a component library, a rule library and a relationship library, and the abstract model performs components fusion to obtain a JSON structure of a fused component; step S3: the JSON structure of the fused component is escaped into a virtual DOM by using a rendering function, and attributes and events of a virtual DOM node are mapped to obtain a fused component drawing result; and step S4: a real DOM structure is created and interpolated into a real DOM node, so as to realize display of the fused component on a view.

5 Claims, 4 Drawing Sheets (56) References Cited

U.S. PATENT DOCUMENTS

2017/0115968 A1* 4/2017 Fukala .................... G06F 16/25
2019/0332358 A1* 10/2019 Ganesh .................... G06F 8/34

* cited by examiner

MULTI-COMPONENT ABSTRACT ASSOCIATION AND FUSION METHOD AND APPARATUS IN PAGE DESIGN

CROSS-REFERENCE TO RELATED APPLICATIONS

The present application claims priority to Chinese Patent Application No. 202210980794.7, filed on Aug. 16, 2022, the content of which is incorporated herein by reference in its entirety.

TECHNICAL FIELD

The present disclosure relates to the technical field of Internet, in particular to a multi-component abstract association and fusion method and an apparatus in page design.

BACKGROUND

With the increase in Internet applications and functional demands, the workload and complexity of front-end are increasing rapidly. A traditional front-end development mode is developed for a specific demand in a customized manner. When demand changes, a service logic code needs to be reconstructed, even if there are similar demand changes, a view layer can be abstracted to effectively reuse a page style. However, developers still need to manually handle page logic and address problems such as data transmission and routing jump. Therefore, automatic processing of the page logic is still a problem to be solved in page design.

The current inventions mainly use component construction for automatic construction of a page. According to target page construction parameters, a component hierarchical layout relationship and the like are determined, and finally they are integrated into the same page, which further achieves automatic construction of the page.

There are several problems on a componentization construction mode in the prior art, firstly, most of component acquisition modes use structured templates, and developers need to configure construction parameters based on existing rules; secondly, a component set can only process hierarchy, layout and style, or integrate parts of components for a specific service, without performing abstract association on multi-component data circulation, event response and the like; and thirdly, in terms of mounting, it is necessary to process the mounting by self, or a single code file is returned, or a page structure is returned, which requires secondary analysis.

In summary, the present disclosure proposes a multi-component abstract association and fusion method and apparatus in page design. An original page construction demand is acquired through speech input; the problem that multi-component fusion cannot process page logic and data transmission is effectively solved through data hijacking; and finally, rendering and mounting of the constructed components are automatically completed based on a mapping relationship.

SUMMARY

In order to solve the above technical problems, the present disclosure provides a multi-component abstract association and fusion method and apparatus in page design.

Technical solutions adopted by the present disclosure are as follows:

A multi-component abstract association and fusion method in page design includes the following steps:

Step S1: acquiring a front-end page construction demand according to an interactive speech input, and analyzing the construction demand through a speech recognition method to obtain a natural language text.

Step S2: constructing an abstract model by predefining a component library, a rule library and a relationship library, and performing, by the abstract model, components fusion to obtain a JSON structure of a fused component.

Step S3: escaping the JSON structure of the fused component into a virtual DOM by using a rendering function, and mapping attributes and events of a virtual DOM node to obtain a fused component drawing result.

Step S4: creating a real DOM structure for the fused component drawing result in a mounting stage, and interpolating the real DOM structure into a real DOM node, so as to realize display of the fused component on a view.

Further, the construction demand in step S1 is natural language description of a page, including required components, attributes and events, data relationship circulation and/or a style logic; and the construction demand is acquired through a question and answer mode, a user performs input through speech or a natural language, and the construction demand is extracted from the inputted speech or natural language through a speech recognition algorithm to obtain a form component, a view component, a navigation component and/or a specified type of component.

Further, step S2 specifically includes the following sub-steps:

Step S21: predefining the component library, the component library includes a view component, a form component, a basic component, a navigation component and/or a customized component, and the component library is used for mapping a component name in the natural language text to a component of a view layer.

Step S22: predefining the rule library, the rule library includes a data layer logic, and the data layer logic is divided into an inherent rule and a rule established based on the construction demand.

Step S23: predefining the relationship library, the relationship library is used for associating and binding relationships among components in the natural language text to register event triggered callbacks for the components.

Step S24: performing entity extraction on the natural language text by using the component library, and analyzing, in a case that a component library entity is found to appear in the natural language text through matching, the component library entity into a corresponding component.

Step S25: adding a processing rule for a component binding value according to the construction demand, and performing initialization after matching and hijacking the component binding value in the rule library by using a component result analyzed in step S24.

Step S26: collecting a dependency relationship between the component and the rule by mapping according to a binding value exposed by the component library and a completed data initialization operation in the rule library, and providing data logic processing for the component in a mode of registering event callbacks to realize data circulation and association among multiple components.

Step S27: integrating single component relationships processed in step S24 to step S26, and representing a fused component relationship by using a preset JSON structure to obtain representation of the JSON structure of the fused component.

Further, the inherent rule in step S22 includes an attribute, a style, layer analyzing, data hijacking and/or context processing.

Further, the initialization in step S25 includes adding a default value for the binding value of the component, adding the processing rule defined in the construction demand, adding a hierarchical relationship of a processing component and/or adding a context relationship for processing the binding value, which provides a basis for data circulation among the components and construction of associations among the components.

Further, step S3 specifically includes the following substeps:

Step S31: converting the JSON structure of the fused component into a virtual DOM structure according to a virtual DOM template predefined in the rule library.

Step S32: acquiring a component binding value, a style and/or event callbacks from the JSON structure of the fused component, and automatically filling the virtual DOM structure with an attribute and an event to obtain an abstract syntax tree.

Step S33: exposing the abstract syntax tree outward by using the rendering function, and mapping the attributes and events of the virtual DOM node to obtain the fused component drawing result.

Further, step S4 specifically includes the following substeps:

Step S41: acquiring a position where the fused component needs to be interpolated into the page according to the construction demand.

Step S42: converting, according to a predefined method in the rule library, the abstract syntax tree of the fused component into the real DOM structure by using a built-in DOM operation application programming interface of a browser.

Step S43: interpolating the real DOM structure according to the page position acquired in step S41, so as to complete the mounting operation.

Further, the predefined method in step S42 is a depth traversal algorithm based on a tree structure.

The present disclosure further provides a multi-component abstract association and fusion apparatus in page design, including a memory and one or more processors, where the memory stores an executable code, and the one or more processors, when executing the executable code, are configured to implement the multi-component abstract association and fusion method in page design described in any one of the above embodiments.

The present disclosure further provides a computer-readable storage medium, storing a program, wherein the program, when executed by a processor, implements the multi-component abstract association and fusion method in page design described in any one of the above embodiments.

The present disclosure has the beneficial effects that
1. By hijacking data to circulate among the components, component binding data may be automatically associated.
2. The fused component is abstracted, and a component structure is analyzed according to the natural language description of the page to automatically configure attributes and events monitoring for the fused component, so that a front-end developer may use a simple construction mode to form a page component logic.
3. A code reuse rate of a front-end project is improved, development time is saved, difficulty of application development is reduced, and efficiency of front-end development is effectively improved.

DESCRIPTION OF EMBODIMENTS

The following description of at least one exemplary embodiment is actually only illustrative and does not serve as any limitation to the present disclosure, and application or use thereof. Based on the embodiments in the present disclosure, all other embodiments obtained by those ordinarily skilled in the art without creative labor fall within the scope of protection of the present disclosure.

Figure 1:
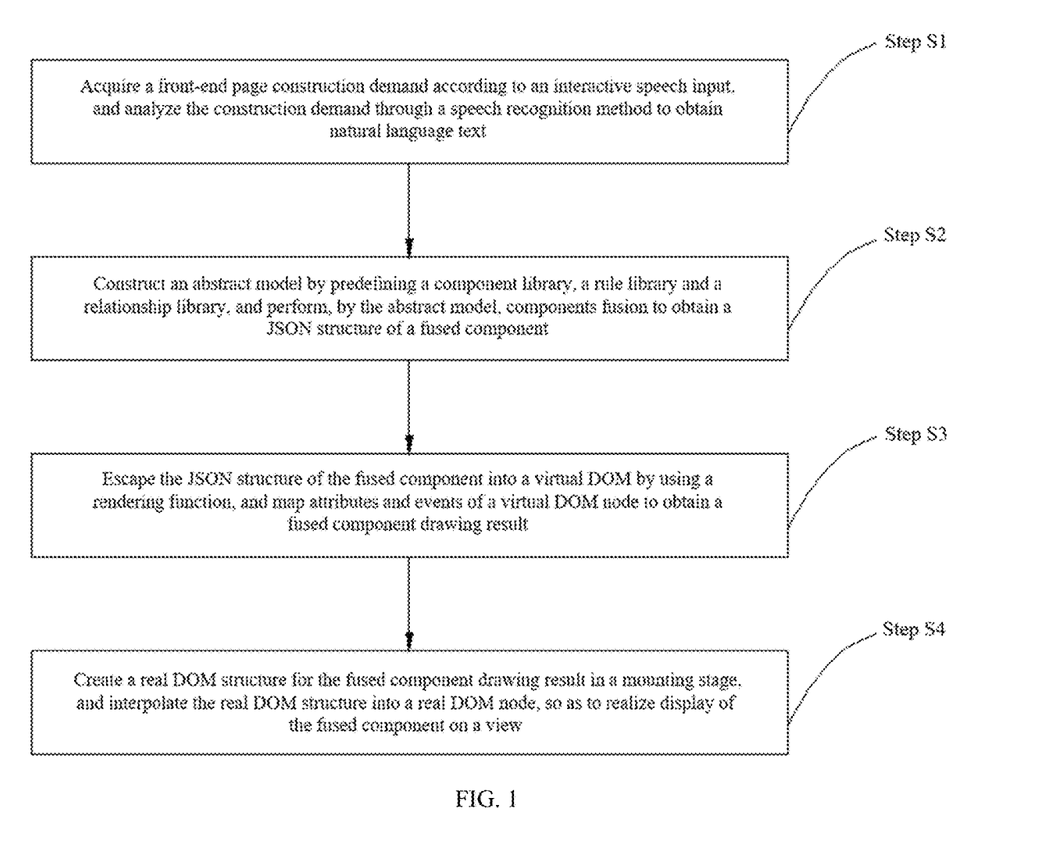
FIG. 1 is a schematic flowchart of a multi-component abstract association and fusion method in page design of the present disclosure.

Referring to FIG. 1, a multi-component abstract association and fusion method in page design includes the following steps:

Step S1: a front-end page construction demand is acquired according to an interactive speech input, and the construction demand is analyzed through a speech recognition method to obtain natural language text.

The construction demand being natural language description of a page, including required components, the attributes and events, data relationship circulation and/or a style logic; and the construction demand being acquired through a question and answer mode, a user inputting through speech or a natural language, and the construction demand being extracted from the inputted speech or natural language through a speech recognition algorithm to obtain a form component, a view component, a navigation component and/or a specified type component.

Step S2: an abstract model is constructed by predefining a component library, a rule library and a relationship library, and the abstract model performs components fusion to obtain a JSON structure of a fused component.

Step S21: the component library is predefined, the component library includes a view component, a form component, a basic component, a navigation component and/or a customized component, and the component library is used for mapping a component name in the natural language text out of a component of a view layer.

Step S22: the rule library is predefined, the rule library includes a data layer logic, the data layer logic is divided into an inherent rule and a rule established based on the construction demand.

The inherent rule includes an attribute, a style, layer analyzing, data hijacking and/or context processing.

Step S23: the relationship library is predefined, the relationship library is used for associating and binding relationships among components in the natural language text to register event triggered callbacks for the components.

Step S24: entity extraction is performed on the natural language text by using the component library, and in a case that a component library entity is found to appear in the natural language text through matching, the component library entity is analyzed into a corresponding component.

Step S25: a processing rule is added for a component binding value according to the construction demand, and initialization is performed after matching and hijacking the component binding value in the rule library by using a component result analyzed in step S24.

The initialization in step S25 including adding a default value for the binding value of the component, adding the processing rule defined in the construction demand, adding a hierarchical relationship of a processing component and/or adding a context relationship for processing the binding value, which provides a basis for data circulation among the components and construction of associations among the components.

Step S26: a dependency relationship between the component and the rule is collected by mapping according to a binding value exposed by the component library and a completed data initialization operation in the rule library, and data logic processing is provided for the component in a mode of registering event callbacks to realize data circulation and association among multiple components.

Step S27: single component relationships processed in step S24 to step S26 are integrated, and a fused component relationship is represented by using a preset JSON structure to obtain a representation of the JSON structure of the fused component.

Step S3: the JSON structure of the fused component is escaped into a virtual DOM by using a rendering function, and attributes and events of a virtual DOM node are mapped to obtain a fused component drawing result.

Step S31: the JSON structure of the fused component is converted into a virtual DOM structure according to a virtual DOM template predefined in the rule library.

Step S32: a component binding value, a style and/or event callbacks are acquired from the JSON structure of the fused component, and the virtual DOM structure is automatically filled with an attribute and an event to obtain an abstract syntax tree.

Step S33: the abstract syntax tree is exposed outward by using the rendering function, and the attributes and events of the virtual DOM node are mapped to obtain the fused component drawing result.

Step S4: a real DOM structure is created for the fused component drawing result in a mounting stage, and the real DOM structure is interpolated into a real DOM node, so as to realize display of the fused component on a view.

Step S41: a position where the fused component needs to be interpolated into the page is acquired according to the construction demand.

Step S42: according to a predefined method in the rule library, the abstract syntax tree of the fused component is converted into the real DOM structure by using a built-in DOM operation application programming interface of a browser.

The predefined method being a depth traversal algorithm based on a tree structure; and Step S43: the real DOM structure is interpolated according to the page position acquired in step S41, so as to complete the mounting operation.

EMBODIMENT

Step S1: a front-end page construction demand is acquired according to an interactive speech input, and the construction demand is analyzed through a speech recognition method to obtain a natural language text.

The construction demand being natural language description of a page, including required components, the attributes and events, data relationship circulation and/or a style logic; and the construction demand being acquired through a question and answer mode, a user inputs speech or a natural language, and the construction demand being extracted from the inputted speech or natural language through a speech recognition algorithm to obtain a form component, a view component, a navigation component and/or a specified type component.

Step S2: an abstract model is constructed by predefining a component library, a rule library and a relationship library, and the abstract model performs components fusion to obtain a JSON structure of a fused component.

Step S21: the component library is predefined, the component library includes a view component, a form component, a basic component, a navigation component and/or a customized component, and the component library is used for mapping a component name in the natural language text out of a component of a view layer.

Step S22: the rule library is predefined, the rule library includes a data layer logic, and the data layer logic is divided into an inherent rule and a rule established based on the construction demand.

The inherent rule including an attribute, a style, layer analyzing, data hijacking and/or context processing.

Layer analyzing is to analyze the hierarchical relationship of the components. For example, a form-type component (selection, input and other components) may be uniformly added as form sub-components.

Data hijacking needs to scan the binding value in the construction demand and process the context relationship, to ensure that the binding value can be accessed in registered events, and thus after the events are triggered, if there is data binding, it may be synchronously changed.

Step S23: the relationship library is predefined, the relationship library is used for associating and binding relationships among components in the natural language text to register event triggered callbacks for the components.

There are two types of component events: a browser default behavior and a user defined behavior. For the first type of browser default events, the event name may directly be component binding, for the user defined behavior, it needs to be set according to events in the construction demand, and both of them are distinguished through the event names. If the user defined event names are the same as the browser default event names, it is considered as browser default registering event callbacks.

Step S24: entity extraction is performed on the natural language text by using the component library, and in a case that a component library entity is found to appear in the natural language text through matching, the component library entity is analyzed into a corresponding component.

Step S25: a processing rule is added for a component binding value according to the construction demand, and initialization is performed after matching and hijacking the component binding value in the rule library by using a component result analyzed in step S24.

The initialization in step S25 including adding a default value for the binding value of the component, adding the processing rule defined in the construction demand, adding a hierarchical relationship of a processing component and/or adding a context relationship for processing the binding value, which provides a basis for data circulation among the components and construction of associations among the components.

Step S26: a dependency relationship between the component and the rule is collected by mapping according to a binding value exposed by the component library and a completed data initialization operation in the rule library, and data logic processing is provided for the component in a mode of registering event callbacks to realize data circulation and association among multiple components.

Step S27: single component relationships processed in step S24 to step S26 are integrated, and a fused component relationship is represented by using a preset JSON structure to obtain representation of the JSON structure of the fused component.

For example, when constructing a page, a table needs to include a column for names, which may be screened according to user inputs, and a current screening condition needs to be maintained during page flipping. At the same time, setting the service logic is that when a predicted cancer probability of a certain patient in the table exceeds 90, a background color of the item is set to be red.

Figure 2:
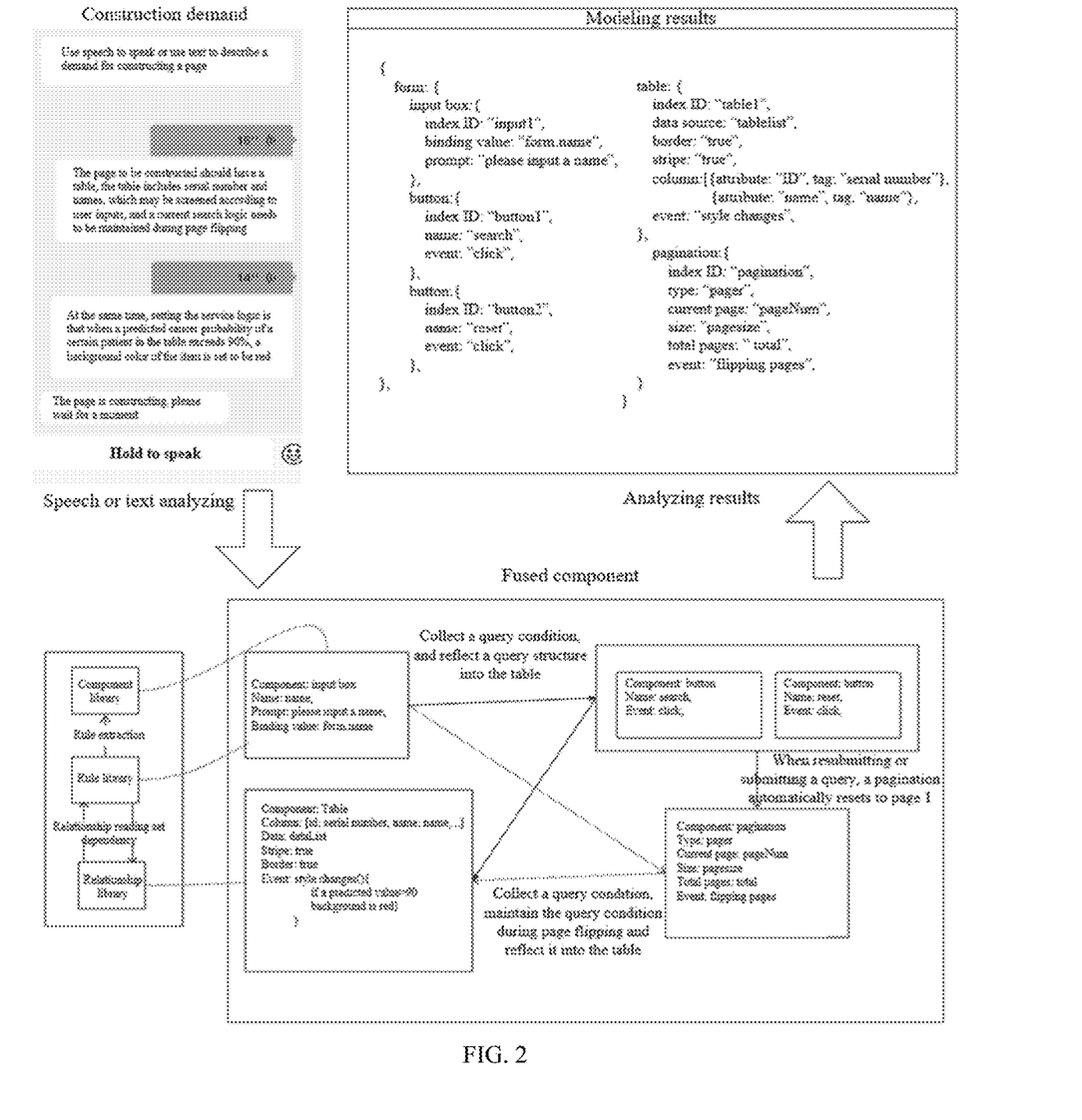
FIG. 2 is an example diagram of an abstract relationship modeling process in an embodiment of the present disclosure.

Based on the above demand background, firstly, an input box, a button, a table and a pagination component are extracted, initial parameters are set for the components, for example, for a table component, it is necessary to set columns displayed in the table, including id, names and the like, table data are from a dataList, the style includes whether it has stripes, whether it has borders and the like, and by changing the style of table bound events, when processing a situation that the predicted cancer probability of a certain patient in the table exceeds 90, the background color of the item is set to be gray. The extracted fused component is analyzed to obtain a program readable JSON structure. Based on this example, the above process is as shown in FIG. 2.

Figure 3:
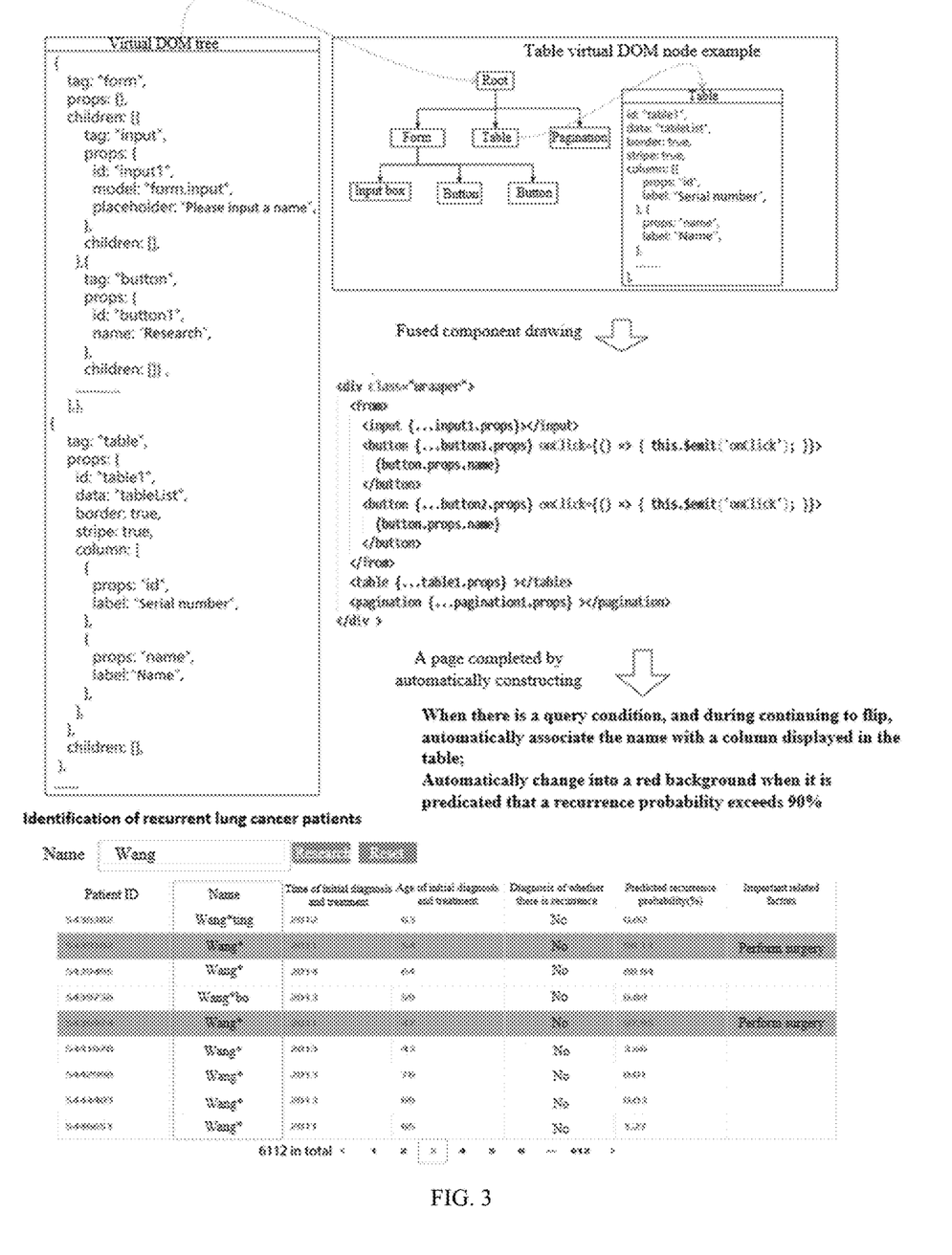
FIG. 3 is an example diagram of a fused component drawing process in an embodiment of the present disclosure.

Referring to FIG. 3, step S3: the JSON structure of the fused component is escaped into a virtual DOM by using a rendering function, and attributes and events of a virtual DOM node are mapped to obtain a fused component drawing result.

Step S31: the JSON structure of the fused component is converted into a virtual DOM structure according to a virtual DOM template predefined in the rule library.

Step S32: a component binding value, a style and/or event callbacks are acquired from the JSON structure of the fused component, and the virtual DOM structure is automatically filled with an attribute and an event to obtain an abstract syntax tree.

Step S33: the abstract syntax tree is exposed outward by using the rendering function, and the attributes and events of the virtual DOM node are mapped to obtain the fused component drawing result.

Step S4: a real DOM structure is created for the fused component drawing result in a mounting stage, and the real DOM structure is interpolated into a real DOM node, so as to realize display of the fused component on a view.

Step S41: a position where the fused component needs to be interpolated into the page is acquired according to the construction demand.

Step S42: according to a predefined method in the rule library, the abstract syntax tree of the fused component is converted into the real DOM structure by using a built-in DOM operation application programming interface of a browser.

The predefined method being a depth traversal algorithm based on a tree structure.

Step S43: the real DOM structure is interpolated according to the page position acquired in step S41, so as to complete the mounting operation.

Based on the demand background mentioned above, the JSON structure of the fused component is escaped into the virtual DOM structure, for example, the table component includes a tag, table attributes are stored in props, including id, data, column, border, stripe and the like, and a length of children being 0 represents that there is no sub-component in the table component. At the same time, associated with a styleChange event, a program code automatically calculates whether the predicted probability is greater than 90. Based on this example, the above process is as shown in FIG. 3.

Figure 4:
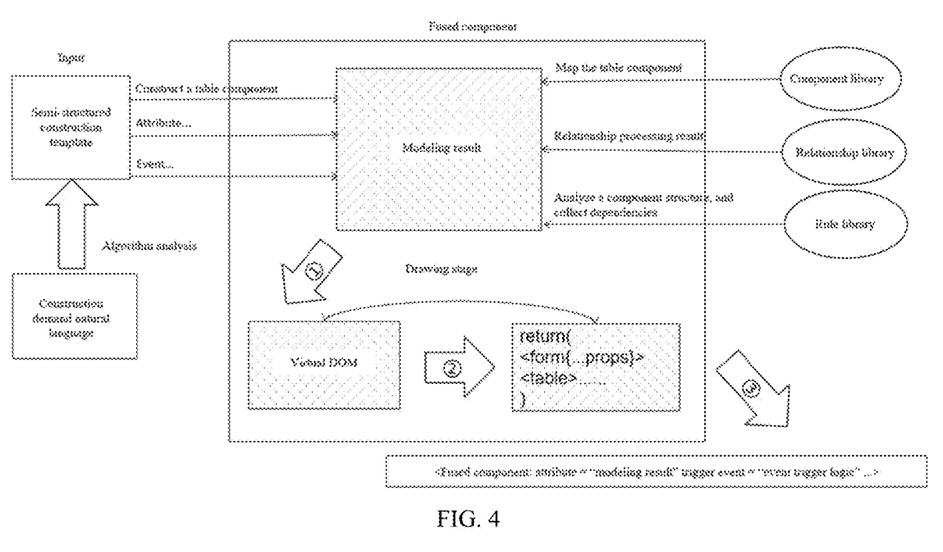
FIG. 4 is a schematic diagram of internal data circulation of a fused component in an embodiment of the present disclosure.

The fused component itself is an abstract-type structure that does not refer to a specific type of a composite component, but rather a component that may be customized according to the construction demand of the user. For the fused component, it is necessary to take an analyzed semi-structured language, namely a construction template as an input parameter, then internally, association between the dependency relationship and the event is automatically processed, a modeling result is transferred to a rendering stage for component drawing, and finally a component exit is exposed, so as to complete component mounting. A schematic diagram of internal data circulation of the fused component is as shown in FIG. 4.

Corresponding to the embodiment of the above multi-component abstract association and fusion method in page design, the present disclosure further provides an embodiment of a multi-component abstract association and fusion apparatus in page design.

Figure 5:
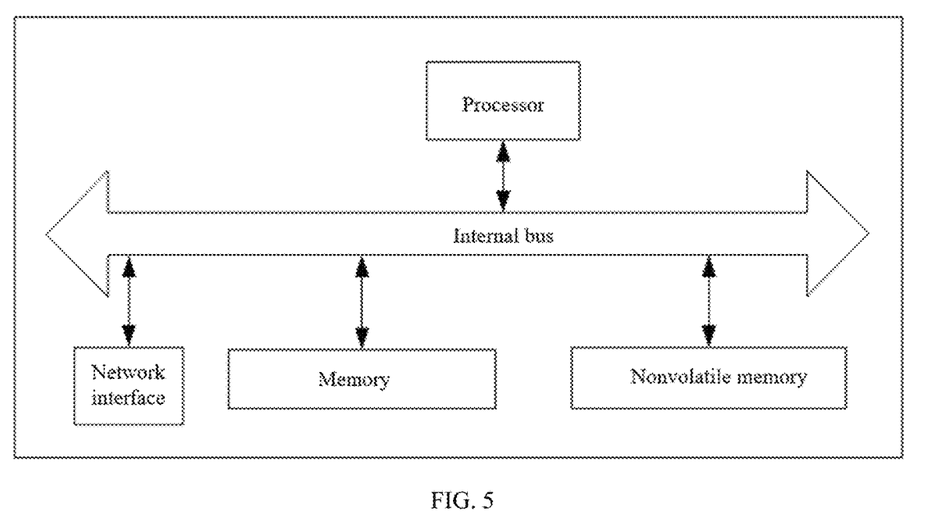
FIG. 5 is a structural diagram of a multi-component abstract association and fusion apparatus in page design of the present disclosure.

Referring to FIG. 5, an embodiment of the present disclosure provides a multi-component abstract association and fusion apparatus in page design, including a memory and one or more processors, wherein the memory stores an executable code, and the one or more processors, when executing the executable code, are configured to implement the multi-component abstract association and fusion method in page design described in the above embodiments.

The embodiment of the multi-component abstract association and fusion apparatus in page design of the present disclosure may be applied to any device with data processing capabilities, which may be a device or apparatus such as a computer. The apparatus embodiment may be implemented by software, hardware or a combination of the hardware and the software. Taking implementation by the software as an example, as an apparatus in a logical sense, it is formed by reading corresponding computer program instructions in a nonvolatile memory to a memory by a processor of any device with the data processing capabilities where the apparatus is located for operation. From the hardware level, as shown in FIG. 5, which is a hardware structural diagram of any device with the data processing capabilities where the multi-component abstract association and fusion apparatus in page design is located of the present disclosure, in addition to a processor, a memory, a network interface and a nonvolatile memory shown in FIG. 5, any device with the data processing capabilities where the apparatus is located in the embodiment may usually further include other hardware according to an actual function of any device with the data processing capabilities, which will not be repeated here.

The implementation process of functions and effects of all units in the above apparatus specifically refers to the implementation process of corresponding steps in the above method, which will not be repeated here.

As for the apparatus embodiments, since they basically correspond to the method embodiments, please refer to the partial description of the method embodiments for the relevant parts. The apparatus embodiments described above are merely illustrative. The units described as separate components may be or may not be physically separated, and the components displayed as units may be or may not be physical units, that is, they may be located in one place, or may be distributed to multiple network units. Some or all of the modules may be selected according to actual needs to realize the purpose of the solution of present disclosure. Those of ordinary skill in the art may understand and implement it without creative labor.

An embodiment of the present disclosure further provides a computer-readable storage medium, storing a program, wherein the program, when executed by a processor, implements the multi-component abstract association and fusion method in page design described in the above embodiments.

The above computer-readable storage medium may be an internal storage unit of any device with the data processing capabilities described in any one of the above embodiments, such as a hard disk or a memory. The computer-readable storage medium may also be an external storage device of any device with the data processing capabilities, such as a plug-in hard disk, a smart media card (SMC), an SD card and a flash card, provided on the device. Further, the computer-readable storage medium may further include both the internal storage unit and the external storage device of any device with the data processing capabilities. The computer-readable storage medium is configured to store the computer program and other programs and data required by any device with the data processing capabilities, and may further be configured to temporarily store data that have been or will be outputted.

The foregoing descriptions are only preferred embodiments of the present disclosure and are not used to limit the present disclosure. For those skilled in the art, the present disclosure may have various modifications and changes. Any modification, equivalent replacement, improvement, etc. made within the spirit and principle of the present disclosure should be included in the scope of protection of the present disclosure.

What is claimed is:

1. A multi-component abstract association and fusion method in page design, comprising steps of:
   step S1) acquiring a front-end page construction demand according to an interactive speech input, and analyzing the construction demand through a speech recognition method to obtain natural language text;
   wherein the construction demand is natural language description of a page, comprising required components, attributes and events, data relationship circulation and/or a style logic; and the construction demand is acquired through a question and answer mode, a user performs input through speech, and the construction demand is extracted from the inputted speech through a speech recognition algorithm to obtain a form component, a view component, a navigation component and/or a specified type of component;
   step S2) constructing an abstract model by predefining a component library, a rule library and a relationship library, and performing, by the abstract model, components fusion to obtain a JSON structure of a fused component;
   wherein step S2 comprises sub-steps of:
   step S21) predefining the component library, wherein the component library comprises a view component, a form component, a basic component, a navigation component and/or a customized component, and the component library is used for mapping a component name in the natural language text to a component of a view layer;
   step S22) predefining the rule library, wherein the rule library comprises a data layer logic, and the data layer logic is divided into an inherent rule and a rule established based on the construction demand; wherein the inherent rule in step S22 comprises an attribute, a style, layer analyzing, data hijacking and/or context processing; layer analyzing is to analyze a hierarchical relationship of components; and the data hijacking needs to scan a binding value in the construction demand and process a context relationship, in such a manner to ensure that the binding value can be accessed in registered events, and after the registered events are triggered, the binding value is capable of being synchronously changed in response to data binding;
   step S23) predefining the relationship library, wherein the relationship library is used for associating and binding relationships among components in the natural language text to register event triggered callbacks for the components; wherein component events comprise two types: a browser default behavior and a user defined behavior; for the browser default behavior, the components are directly bound through an event name; for the user defined behavior, the components need to be set according to events in the construction demand; the browser default behavior and the user defined behavior are distinguished through the event name; and if a user defined event name is the same as a browser default event name, the event is identified as browser default registering event callbacks;
   step S24) performing entity extraction on the natural language text by using the component library, and analyzing, in a case that a component library entity is found to appear in the natural language text through matching, the component library entity into a corresponding component;
   step S25) adding a processing rule for a component binding value according to the construction demand, and performing initialization after matching and hijacking the component binding value in the rule library by using a component result analyzed in step S24; wherein the initialization in step S25 comprises adding a default value for the binding value of the component, adding the processing rule defined in the construction demand, adding a hierarchical relationship of a processing component and/or adding a context relationship for processing the binding value, in such a manner to provide a basis for data circulation among the components and construction of associations among the components;
   step S26) collecting a dependency relationship between the component and the rule by mapping according to a binding value exposed by the component library and a completed data initialization operation in the rule library, and providing data logic processing for the component in a mode of registering event callbacks to realize data circulation and association among multiple components;
   step S27) integrating single component relationships processed in step S24 to step S26, and representing a fused component relationship by using a preset JSON structure to obtain a representation of the JSON structure of the fused component;

step S3) escaping the JSON structure of the fused component into a virtual DOM by using a rendering function, and mapping attributes and events of a virtual DOM node to obtain a fused component drawing result;
wherein step S3 comprises sub-steps of:
step S31) converting the JSON structure of the fused component into a virtual DOM structure according to a virtual DOM template predefined in the rule library;
step S32) acquiring a component binding value, a style and/or event callbacks from the JSON structure of the fused component, and automatically filling the virtual DOM structure with an attribute and an event to obtain an abstract syntax tree; and
step S33) exposing the abstract syntax tree outward by using the rendering function, and mapping the attributes and events of the virtual DOM node to obtain the fused component drawing result;
step S4) creating a real DOM structure for the fused component drawing result in amounting stage, and interpolating the real DOM structure into a real DOM node, so as to realize display of the fused component on a view.

2. The multi-component abstract association and fusion method in page design according to claim 1, wherein step S4 comprises sub-steps of:
step S41) acquiring a position where the fused component needs to be interpolated into the page according to the construction demand;
step S42) converting, according to a predefined method in the rule library, the abstract syntax tree of the fused component into the real DOM structure by using a built-in DOM operation application programming interface of a browser; and
step S43) interpolating the real DOM structure according to the page position acquired in step S41, so as to complete the mounting operation.

3. The multi-component abstract association and fusion method in page design according to claim 2, wherein the predefined method in step S42 is a depth traversal algorithm based on a tree structure.

4. A multi-component abstract association and fusion apparatus in page design, comprising a memory and one or more processors, wherein the memory stores an executable code, and the one or more processors, when executing the executable code, are configured to implement the multi-component abstract association and fusion method in page design according to claim 1.

5. A non-transitory computer-readable storage medium, storing a program, wherein the program, when executed by a processor, implements the multi-component abstract association and fusion method in page design according to claim 1.

* * * * *